United States Patent [19]

Blair

[11] Patent Number: 5,101,626
[45] Date of Patent: Apr. 7, 1992

[54] EXHAUST GAS DISCHARGE SYSTEM FOR TWO-STROKE INTERNAL COMBUSTION ENGINE

[75] Inventor: Alan J. Blair, Gurnee, Ill.

[73] Assignee: Outboard Marine Corporation, Waukegan, Ill.

[21] Appl. No.: 554,542

[22] Filed: Jul. 19, 1990

[51] Int. Cl.⁵ .......................................... F02B 27/02
[52] U.S. Cl. ................................................ 60/313
[58] Field of Search ........................................ 60/313

[56] References Cited

U.S. PATENT DOCUMENTS

| | | | |
|---|---|---|---|
| 3,367,311 | 2/1968 | Tenney | 60/313 |
| 3,692,006 | 9/1972 | Miller et al. | 60/312 |
| 3,808,807 | 5/1974 | Lanpheer | 60/313 |
| 4,116,172 | 9/1978 | Lohr et al. | 60/313 |
| 4,342,195 | 8/1982 | Lo | 60/313 |
| 4,732,118 | 3/1988 | Tanahashi et al. | 60/314 |
| 4,732,124 | 3/1988 | Nakamura et al. | 60/314 |
| 4,800,720 | 1/1989 | Okada | 60/313 |
| 4,813,232 | 3/1989 | Hitomi | 60/313 |
| 4,835,965 | 6/1989 | Poehlman | 60/313 |

Primary Examiner—Douglas Hart
Attorney, Agent, or Firm—Michael, Best & Friedrich

[57] ABSTRACT

Disclosed herein is a two stroke internal combustion engine comprising first, second, third, and fourth cylinders which fire in a predetermined sequence and which include respective first, second, third, and fourth exhaust ports which open and close in response to piston movement, and an exhaust gas discharge system communicating with the exhaust ports, including a duct portion, and being operable, in response to opening of one of the exhaust ports, to afford passage of exhaust gas from the one exhaust port to the exhaust gas discharge system so as to provide an outgoing positive acoustical pressure wave which travels in the duct portion and which arrives at the exhaust port of the previously fired cylinder prior to closure of the exhaust port of the previously fired cylinder and to provide a returning negative acoustical pressure wave which travels in the duct portion after substantial completion of the travel of the outgoing positive acoustical pressure wave in the duct portion and which arrives at the one exhaust port prior to closing of the one exhaust port.

16 Claims, 2 Drawing Sheets

EXHAUST GAS DISCHARGE SYSTEM FOR TWO-STROKE INTERNAL COMBUSTION ENGINE

BACKGROUND OF THE INVENTION

1. Field of the Invention

The invention relates generally to internal combustion engines and, more particularly, to two-stroke internal combustion engines. Still more particularly, the invention relates to exhaust gas discharge arrangements or systems for such engines, which exhaust gas discharge arrangements are intended to increase horse power output by applying a negative acoustical pressure wave or pulse at the exhaust port of the cylinder originating an outgoing pressure wave or pulse and by applying the positive outgoing acoustical pressure wave or pulse at the exhaust port of the immediately previously fired cylinder and at a time just prior to closure of the last mentioned exhaust port.

2. Reference to Prior Art

At least one exhaust gas discharge system has been known in the prior art for utilizing outgoing positive acoustical pressure waves or pulses occurring incident to the opening of an exhaust port subsequent to a cylinder firing to assist in evacuation of the burnt exhaust gas from the exhaust port and for increasing the density of the fuel/air mixture present in the cylinder which was immediately previously fired. More particularly, the prior exhaust gas discharge system operated to apply a negative acoustical pressure wave or pulse to an exhaust port of a cylinder originating an outgoing positive acoustical pressure wave or pulse, thereby diminishing the pressure at the originating exhaust port so as to assist in evacuation or scavenging of the burnt exhaust gas, and to apply the outgoing positive acoustical pressure wave or pulse to the exhaust port of the immediately previously fired cylinder at a time just prior to closure thereof so as to increase the density or quantity of the next charge in the immediately previously fired cylinder. Such application of a returning negative acoustical pressure wave or pulse so as to diminish the pressure at an open exhaust port is referred to hereinafter as "scavenging". Such application of a positive acoustical pressure wave or pulse prior to closure of an exhaust port is referred to herein as "plugging".

The prior exhaust gas discharge system is shown schematically in FIG. 1, is identified by the numeral 10 and is associated with an even firing V-block engine including first, second, third, and fourth cylinders 1,2,3,4, respectively, which are fired in the order 1-2-3-4, and which include respective exhaust ports 11, 12, 13, and 14. Connected to the respective exhaust ports 11, 12, 13, and 14 are respective first, second, third and fourth cylinder exhaust gas discharge pipes or ducts 21, 22, 23, and 24 which are of equal length. The first and third cylinder exhaust gas discharge pipes 21 and 23 merge at a junction 26, and the second and fourth cylinder exhaust gas discharge pipes 22 and 24 merge at a junction 28. Extending from the junctions 26 and 28 are respective first and second exhaust pipes 30 and 32 which, in turn, merge at a junction 34. Also included in the prior exhaust gas discharge system or arrangement 10 is a third or exhaust gas discharge pipe 36 which extends from the junction 34 and, at its outer end, communicates with the atmosphere.

In operation, each acoustical pressure wave or pulse occurring consequent to each opening of the exhaust ports is generally identical.

More specifically, upon opening of one of the exhaust ports, i.e., for example, the second exhaust port 12, hereinafter referred to as the originating port, an outgoing acoustical positive pressure wave or pulse is discharged from the second cylinder 2 and travels through the cylinder exhaust gas discharge pipe 22 and through the exhaust pipe 32 to the junction 34.

From the junction 34, the outgoing positive acoustical pressure wave or pulse travels up the exhaust pipe 30 and up the cylinder exhaust gas discharge pipe 21 communicating with the immediately previously fired cylinder, i.e., to the exhaust port 11 of the cylinder 1, arriving there at a time just prior to closure of the exhaust port 11, thereby tending to push or plug fuel/air mixture in the cylinder exhaust gas discharge pipe 11 back into the cylinder and thereby plugging or increasing the density of the fuel/air charge in the cylinder 1.

At the same time, the outgoing positive acoustical wave or pulse also travels from the junction 34 outwardly through the exhaust discharge pipe 36 to the atmosphere. When the outgoing positive acoustical wave or pulse expands at the outer end of the exhaust discharge pipe 36, a negative acoustical returning acoustical wave or pulse is created, which returning negative wave or pulse travels back up the exhaust discharge pipe 36, past the junction 34, to the cylinder exhaust gas discharge pipe 22, and to the originating cylinder 2, arriving at the exhaust port 12 thereof at the time of scavenging thereof, i.e. at about the time when the associated piston is about at bottom dead center, thereby increasing the exhaust gas flow from the originating cylinder 2.

In the prior exhaust gas discharge system 10, the exhaust discharge pipe 36 had a length which was less then the lengths of the exhaust paths from the junction 34 to the exhaust ports 11, 12, 13, and 14. Furthermore, because of the relatively short length of the exhaust discharge pipe 36, the total time interval of outward and return acoustical wave travel in the exhaust discharge pipe 36 was less than the time interval during which the outgoing positive acoustical wave or pulse emanated from the originating exhaust port 12. As a consequence, the outgoing positive acoustical wave or pulse was still traveling through and past the junction 34 when the returning negative acoustical wave or pulse initially arrived back at the junction 34. As a consequence, the strength or magnitude of at least a part of the outgoing positive acoustical wave or pulse traveling toward the exhaust port 11 of the immediately previously fired cylinder 1 was diminished, with the result that less than an optimum increase in the fuel/air mixture density in the previously fired cylinder was obtained.

It is noted that, in the prior system, the blow down pulse, i.e., the exhaust gas pulse outgoing from the exhaust port, took place over a time interval such that the blow down pulse was still present at the junction 34 at the time when the returning negative wave arrived at the junction 34, whereby diminishment in the magnitude of the outgoing blow down pulse as well as of the returning wave occurred.

I other words, in the prior system shown in FIG. 1, the length from the junction 34 to the atmosphere was only about half of the length from the exhaust ports to the junction 34.

Attention is also directed to the following United States Patents:

| | | |
|---|---|---|
| 3,367,311 | Tenney | February 6, 1968 |
| 3,692,006 | Miller, et al. | September 19, 1972 |
| 4,116,172 | Lohr, et al. | September 26, 1978 |
| 4,732,118 | Tanahashi, et al. | March 22, 1988 |
| 4,732,124 | Nakamura, et al. | March 22, 1988 |

SUMMARY OF THE INVENTION

The invention provides a two stroke internal combustion engine comprising first, second, third, and fourth cylinders which fire in a predetermined sequence and which include respective first, second, third, and fourth exhaust ports which open and close in response to piston movement, and an exhaust gas discharge system communicating with the exhaust ports, including a duct portion, and being operable, in response to opening of one of the exhaust ports, to afford passage of exhaust gas from the one exhaust port to the exhaust gas discharge system so as to provide an outgoing positive acoustical pressure wave which travels in the duct portion and which arrives at the exhaust port of the previously fired cylinder prior to closure of the exhaust port of the previously fired cylinder and to provide a returning negative acoustical pressure wave which travels in the duct portion after substantial completion of the travel of the outgoing positive acoustical pressure wave in the duct portion and which arrives at the one exhaust port prior to closing of the one exhaust port.

The invention also provides a two stroke internal combustion engine comprising first, second, third, and fourth cylinders which fire in a predetermined sequence and which include respective first, second, third, and fourth exhaust ports which open and close in response to piston movement, and an exhaust gas discharge system communicating with the exhaust ports and including means operable, incident to opening of one of the exhaust parts and the consequent emanation of an outgoing positive acoustical pressure wave from the one exhaust port, for applying the outgoing positive acoustical pressure wave to the exhaust port of the previously fired cylinder, for generating a returning negative acoustical pressure, and for applying the returning negative acoustical pressure pulse to the one exhaust port, and means for substantially preventing the returning negative acoustical pressure wave from adversely affecting the magnitude of the outgoing positive acoustical pressure wave applied to the exhaust port of the immediately previously fired cylinder.

In one embodiment of the invention, the exhaust passage system includes respective first, second, third, and fourth exhaust gas ducts having respective first ends communicating respectively with the exhaust ports of the first, second, third, and fourth cylinders, having respective second ends, and of being of equal length between the first and second ends, which second ends of the first end third ducts communicate with each other at a first junction and which second ends of the second and fourth ducts communicate with each other at a second junction, a first exhaust pipe having a first end communicating with the first junction and having a second end communicating with the atmosphere, a second exhaust pipe having a first end communicating with the second junction and having a second end communicating with the atmosphere, and a third exhaust pipe separate from the first and second exhaust pipes and having a first end communicating with the first junction, and a second end communicating with the second junction.

Various other objects and advantages of the invention will become known by reference to the following general description, claims, and drawings.

THE DRAWINGS

Figure 1:
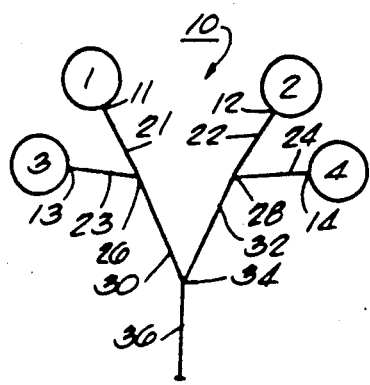
FIG. 1 is a schematic view of a prior art exhaust gas discharge system for a two-stroke internal combustion engine.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Figure 2:
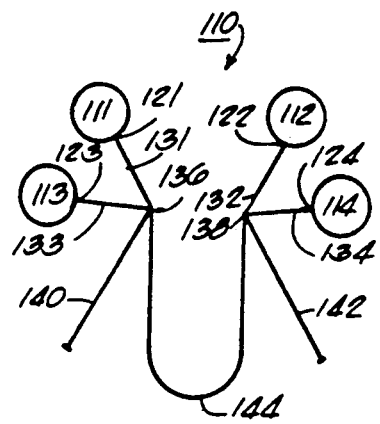
FIG. 2 is a schematic view of an exhaust gas discharge system for a two-stroke internal combustion engine, which discharge system embodies various of the features of the invention.

Shown in FIG. 2 is an exhaust gas discharge system 110 which is associated with a four-cylinder two-stroke engine and which is arranged to avoid the diminishment of optimum fuel/air mixture density occurring with the prior exhaust discharge system 10. The engine includes first, second, third, and fourth cylinders 111, 112, 113, and 114 which are fired in the order 111-112-113-114 and at an even firing interval of 90°, and which include respective first, second, third, and fourth exhaust ports 121, 122, 123, and 124.

The exhaust gas discharge system 110 includes first, second, third, and fourth cylinder discharge exhaust gas pipes 131, 132, 133, and 134 having respective first ends which communicate with the exhaust ports 121, 122, 123, and 124, which also have spaced second ends, and which are all of generally equal length. The second ends of the first and third cylinder exhaust gas discharge pipes 131 and 133 merge at a first junction 136 and the second and fourth cylinder exhaust gas discharge pipes 132 and 134 merge at a second junction 138.

The exhaust gas discharge system 110 also includes means for substantially preventing returning negative acoustical pressure waves or pulses from adversely affecting the strength or magnitude of the outgoing positive acoustical pressure waves or pulses which are applied to the exhaust ports of the immediately previously fired cylinders. While various arrangements can be employed, in the construction disclosed in FIG. 2, such means comprises first and second exhaust gas discharge pipes 140 and 142 which respectively communicate with the junctions 136 and 138, which are of equal length, and preferably of greater than the length of the cylinder exhaust gas discharge pipes 131, 132, 133, and 134, and which, at the outer ends thereof, discharge into the atmosphere. Preferably the exhaust gas discharge pipes 140 and 142 constitute megaphones, i.e., the cross sections of the pipes 140 and 142 gradually increases from the junctions 136 and 138 to the outer discharge ends.

The means for preventing an adverse affect by the returning acoustical pressure waves or pulses on the outgoing waves or pulses also includes a connecting exhaust gas pipe 144 which extends between and communicates with the junctions 136 and 138 and which has a length designed to "tune" the engine for a particular operating engine speed, and which, accordingly, can be of various lengths. In general, relatively high engine speeds are associated with relatively shorter lengths and relatively low engine(speeds are associated with longer lengths. In the disclosed construction, the connecting gas pipe has a length more than twice the length of the individual exhaust gas discharge pipes 140 and 142.

Preferably, and in the disclosed construction, the combined acoustical flow length of two of the exhaust ducts and the third exhaust pipe is such that, at normal engine operating speed, an acoustical wave will travel through the combined length during a time interval approximately equal to the time interval of about 70 degrees of crankshaft rotation. In addition, the combined acoustical length of one of the exhaust ducts and one of the exhaust pipes is such that, at normal engine operating speed, an acoustical wave will travel through the combined length during a time interval approximately equal to the time interval of about 80 degrees of crankshaft rotation.

Figure 3:
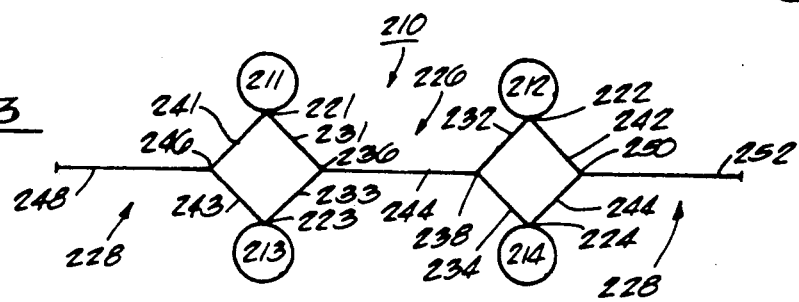
FIG. 3 is a schematic view of another embodiment of an exhaust gas discharge system for a two-stroke internal combustion engine, which discharge system embodies various of the features of the invention.

The operation of the exhaust gas discharge system 110 is essentially the same as the operation of prior exhaust gas discharge system 10 except that the outgoing positive acoustical pressure waves or pulses travel outwardly past the junctions 136 and 138 to the associated exhaust gas discharge pipes 140 and 142 and the connecting exhaust gas pipe 144. The outgoing positive acoustical pressure waves or pulses traveling in the connecting exhaust gas pipe 144 travel past the other junction and then through the cylinder exhaust gas pipes to the exhaust ports 121, 122, 123, and 124 of the immediately previously fired cylinder In addition, the exhaust gas discharge system differs from the prior exhaust discharge system 10 in that the length of the exhaust pipes 140 and 142 is sufficiently great so that the time interval occurring during outward and return acoustical wave travel in the exhaust pipes 140 and 142 is greater than the time interval during which the outgoing positive acoustical waves emanate from the originating exhaust port. As a consequence, the outgoing positive waves, which travel from the cylinder exhaust discharge pipes 131, 132, 133, and 134 and past the junctions 136 and 138 to the connecting pipe 144 so as to apply plugging positive pressure waves to the exhaust ports of the immediately previously fired cylinders, have completed travel through the junctions 136 and 138 prior to arrival at the junctions 136 and 138 of the returning negative acoustical pressure waves As a consequence, the strength or magnitude of the outgoing positive acoustical pressure waves is not adversely affected Shown in FIG. 3 is another exhaust gas discharge system 210 which embodies various of the features of the invention and which extends from first, second, third, and fourth cylinders 211, 212, 213, and 214 which are evenly fired in a 211-212-213-214 sequence and which include respective exhaust ports 221, 222, 223, and 224. The exhaust gas discharge system 210 includes means for substantially preventing returning negative acoustical pressure waves from adversely affecting the strength or magnitude of outgoing positive acoustical pressure waves which are applied to the exhaust port of the immediately previously fired cylinder. In the construction shown in FIG. 3, such means comprises a first sub-system 226 for travel of the outgoing positive acoustical pressure waves which are applied to the exhaust ports of the immediately previously fired cylinders and a second sub-system 228 for travel of outgoing positive acoustical pressure waves which are discharged to the atmosphere and which create negative returning acoustical pressure waves which assist scavenging of the originating cylinders.

More particularly, while other constructions can be employed, in the disclosed construction, the first or plugging sub-system 226 includes four "plugging" exhaust gas pipes 231, 232, 233, and 234 which respectively extend from the exhaust gas ports 221, 222, 223, and 224, and which are of equal length. The first and third exhaust gas pipes 221 and 223 merge at a junction 236 and the second and fourth exhaust gas pipes 232 and 234 merge at a junction 238. In turn, the junctions 236 and 238 are connected by a connecting exhaust gas pipe 244.

The second or scavenging sub-section 228 includes first, second, third, and fourth cylinder exhaust gas discharge pipes 241, 242, 243, and 244 which respectively communicate with the first, second, third, and fourth exhaust ports 221, 222, 223, and 224 and which are of equal length. The first and third cylinder exhaust gas discharge pipes 241 and 243 merge at a junction 246 which also communicates with an exhaust gas discharge pipe 248 which, at its outer end, communicates with the atmosphere. The second and fourth cylinder exhaust gas discharge pipes 242 and 244 merge at a junction 250 which also communicates with a second exhaust gas discharge pipe 252 which, at its outer end, communicates with the atmosphere.

In this embodiment, positive acoustical waves which "plug" the exhaust ports of the immediately previously fired cylinders travel through the "plugging" sub-section 226, while outgoing positive acoustical pressure waves which create negative returning acoustical pressure waves travel through the scavenging sub-section 228. As a consequence, travel of the acoustical pressure waves in the "plugging" sub-section 226 and in the scavenging sub-section 228 are independent of each other. Consequently, returning negative acoustical pressure waves are prevented from adversely affecting the strength or magnitude of the outgoing positive acoustical pressure waves which are applied to the exhaust ports of the previously fired cylinders.

Figure 4:
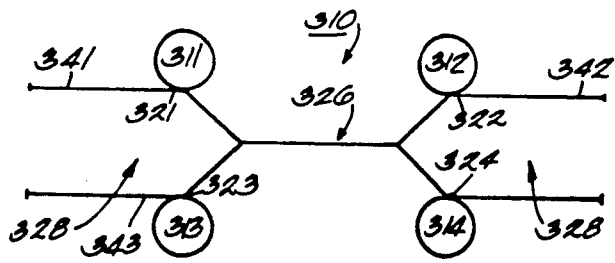
FIG. 4 is a schematic view of still another embodiment of an exhaust gas discharge system for a two-stroke internal combustion engine, which discharge system embodies various of the features of the invention.

Shown in FIG. 4 is still another embodiment of an exhaust gas discharge system 310 which embodies various of the features of the invention and which is similar to the system 210 shown in FIG. 3 except that the cylinder exhaust gas discharge pipes do not merge at junctions such as shown in FIG. 3 but instead, the system 310 employ first, second, third, and fourth cylinder discharge pipes 341, 342, 343, and 344, respectively, which are completely independent of one another and respectively extend from the exhaust ports 321, 322, 323, and 324 to the atmosphere. Thus, in the exhaust gas discharge system 310, as in the system 210 shown in FIG. 3, there is provided both a plugging sub-section 326 and a scavenging sub-section 328 which are mutually independent and which operate such that returning negative acoustical pressure waves are prevented from adversely affecting the strength or magnitude of the outgoing positive waves which are applied to the exhaust ports of the immediately previously fired cylinders.

Figure 5:
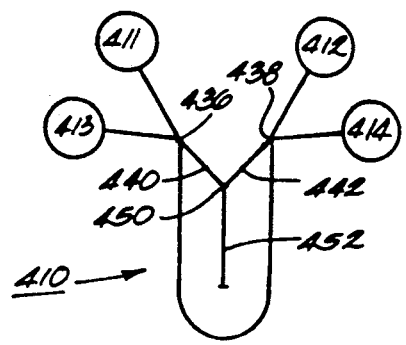
FIG. 5 is a schematic view of still another embodiment of an exhaust gas discharge system for a two-stroke internal combustion engine, which discharge system embodies various of the features of the invention.

Shown in FIG. 5 is still another embodiment of an exhaust gas discharge system 410 which embodies various of the features of the invention and which is generally identical to the system 110 shown in FIG. 2 except that the exhaust gas discharge pipes 440 and 442 leading from the junctions 436 and 438 merge at a junction 450 into a common exhaust gas discharge pipe 452. The system 410 is applicable where the available space in a marine propulsion device precludes the use of two or more outlet independent or exhaust gas discharge pipes 140 and 142 as shown, for instance, in the FIGS. 2, 3, and 4 embodiments. In the system 410 shown in FIG. 5, while there will be some interference between the scavenging or returning negative acoustical pressure pulse and the plugging or outgoing positive acoustical wave or pulse, the strength or magnitude of the scavenging or positive acoustical pressure wave or pulse which is applied at the exhaust port of the previously fired cylinders will still be increased as compared to the prior exhaust discharge system shown in FIG. 1.

In operation, it is noted that the arrangement shown in FIG. 5 operates essentially the same as the arrangement shown in FIG. 2 in that the returning negative pressure waves do not adversely affect the plugging or outgoing positive acoustical pressure waves as the transit of the plugging or outgoing positive acoustical pressure waves transit or passed by the junctions prior to the time when the scavenging or returning negative acoustical pressure waves return to the junctions.

It is also noted that the exhaust gas discharge pipes are all of equal length between the cylinders and the junctions, and that the exhaust pipes to the atmosphere are of equal length and are of an equal length which is, preferably, less than half of the length of the connecting pipe.

Figure 6:
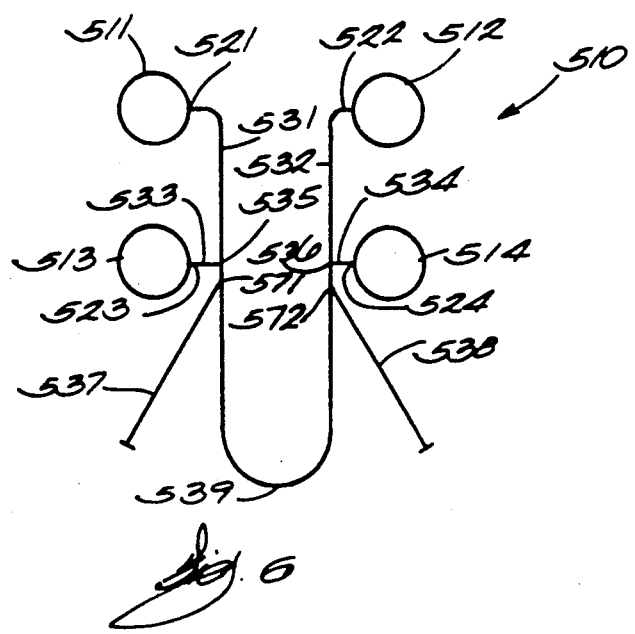
FIG. 6 is a schematic view of still another embodiment of an exhaust gas discharge system for a two-stroke internal combustion engine, which discharge system embodies various of the features of the invention.

Shown in FIG. 6 is still another embodiment of an exhaust gas discharge system 510 which includes various of the features of the invention and which includes four cylinders 511, 512, 513, and 514 having respective exhaust ports 521, 522, 523, and 524 connected respectively with cylinder exhaust gas discharge ducts or pipes 531, 532, 533, and 534. The exhaust gas discharge system 510 primarily differs from the embodiment shown in FIG. 2 in that the cylinder exhaust has discharge pipes 531, 532, 533, and 534 which are not all of equal length. In particular, the cylinder exhaust gas discharge pipes or ducts 531 and 532 are of equal length and the cylinder exhaust gas discharge pipes or ducts 533 and 534 are of equal length but are considerably shorter than the cylinder exhaust gas discharge pipes or ducts 531 and 532. However, as in the other embodiments, the exhaust gas discharge system 510 does provide for separation of the plugging or the outgoing positive acoustical pressure wave or pulse from the scavenging or returning acoustical pressure wave or pulse. Specifically in this regard, the first and third cylinder exhaust gas pipes or ducts 531 and 533 merge at a junction 535 and the second and fourth cylinder exhaust gas discharge pipes 532 and 534 merge at a junction 536. In addition, the exhaust gas discharge system 510 includes respective exhaust pipes 537 and 538 which respectively extend from the junctions 535 and 536 and a connecting exhaust pipe 539 which connects the junctions 535 and 536. It is also noted that the exhaust pipe or ducts 537 and 538 and the connecting pipe 539 share respective common duct portions 571 and 572 which, in the embodiment shown in FIG. 6, are relatively short.

Figure 7:
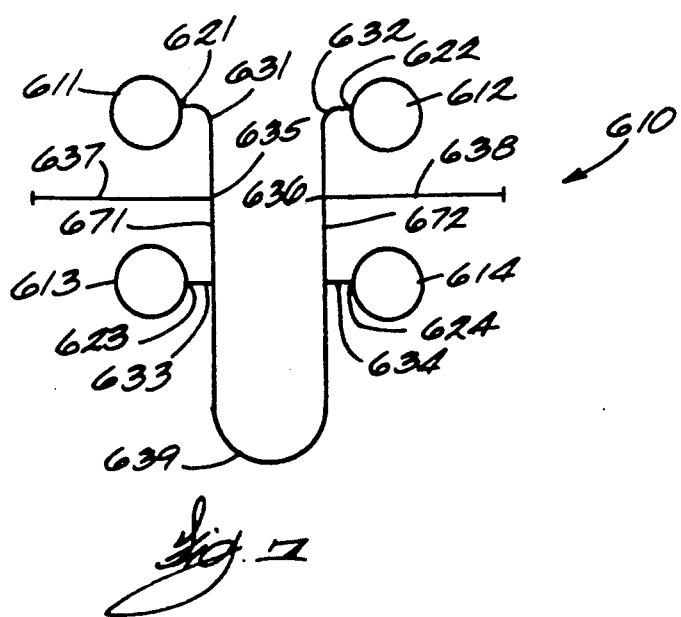
FIG. 7 is a schematic view of still another embodiment of an exhaust gas discharge system for a two-stroke internal combustion engine, which discharge system embodies various of the features of the invention.

Shown in FIG. 7 is still another embodiment of an exhaust gas discharge system 610 which embodies various of the features of the invention and which includes cylinders 611, 612, 613, and 614 having respective exhaust ports 621, 622, 623, and 624 connected respectively with cylinder exhaust gas discharge pipes 631, 632, 633, and 634. In the embodiment shown in FIG. 7, the first and third cylinder exhaust gas pipes 631 and 633 merge at a junction 635 and the second and fourth cylinder exhaust gas discharge pipes 632 and 634 merge at a junction 636. As in the other embodiments, the exhaust gas discharge arrangement 610 includes exhaust pipes 637 and 638 which respectively extend from the junctions 635 and 636 and which, at their outer ends, discharge into the atmosphere, as well as a connecting pipe 639 which extends between the junctions 635 and 636.

The construction shown in FIG. 7 differs primarily from that of the preceding embodiments in that the third and fourth cylinder exhaust gas discharge pipes 633 and 634 and the connecting pipe 639 share respective common duct portions 671 and 672.

The invention disclosed herein is equally applicable to V-block engines and to in-line engines. Further, the invention is applicable to engines having four cylinder and to engines having a number of cylinders equal to any multiple of four.

It is noted that, in the new system, travel of the blow down pulse, i.e., the exhaust gas pulse outgoing from the exhaust port, is completed before arrival of the returning negative wave at the junctions 136, 138, 436, 438, 571, 572, 635, 636, thereby avoiding diminishment of the magnitude of the outgoing blow down pulse, as well as of the returning negative wave.

In the new system, the lengths from the exhaust ports to the junctions 136, 138, 436, 438, 571, 572, 635, and 636 are, in the preferred construction, less than the lengths from the junctions to the atmosphere, and a separate flow path 144, 244, 539, 639 is provided for travel of the positive blow down pulse to the previously fired cylinder.

It is also noted that, in the new system, the blow down pulse occurs over a time interval less than the time interval of pulse travel in the exhaust pipes from the junctions 136, 138, 436, 438, 571, 572, 635, 636, to the outer end and back to the junction.

The new exhaust system includes a flow path for travel of a blow down pulse from the exhaust port of the originating one of the cylinders to the exhaust port of the cylinder fired immediately previously to the originating one of the cylinders, and a discharge branch flow path extending from the blow down pulse path to the atmosphere, which discharge branch flow path has a length affording acoustical travel through a time interval greater than half the duration or time interval of the blow down pulse. Specifically, the time interval occurring during outward and return acoustical wave travel in the exhaust discharge pipes is greater than the time interval during which the outgoing wave emanates from the originating exhaust port. Hence, the discharge flow in the pulse path to the atmosphere affords acoustical travel through a time interval greater than half the duration of the blow down pulse.

Various of the features of the invention are set forth in the following claims.

I claim:

1. A two stroke internal combustion engine comprising first, second, third, and fourth cylinders which sequentially fire in the stated series and at an even firing interval of 90° and which include respective first, second, third, and fourth exhaust ports which open and close in response to piston movement, and an exhaust gas discharge means communicating with said exhaust ports, including a duct portion, and being operable, in response to firing of said second cylinder and opening of said second exhaust port, to afford passage of exhaust gas from said second exhaust port so as to provide an outgoing positive acoustical pressure wave which travels in said duct portion and which arrives at said first exhaust port prior to closure of said first exhaust port and to provide a returning negative acoustical pressure wave which travels in said duct portion after substantial completion of the travel of said outgoing positive acoustical pressure wave in said duct portion and which arrives at said second exhaust port prior to closing of said second exhaust port.

2. An internal combustion engine in accordance with claim 1 wherein said exhaust passage means includes respective first, second, third, and fourth exhaust gas ducts having respective first ends communicating respectively with said exhaust ports of said first, second, third, and fourth cylinders, having respective second ends, and being of equal length between said first and second ends said second ends of said first and third ducts communicating with each other at a first junction and said second ends of said second and fourth ducts communicating with each other at a second junction, a first exhaust pipe having a first end communicating with said first junction and having a second end communicating with the atmosphere, a second exhaust pipe having a first end communicating with said second junction and having a second end communicating with the atmosphere, and a third exhaust pipe separate from said first and second exhaust pipes and having a first end communicating with said first junction, and a second end communicating with said second junction.

3. An internal combustion engine in accordance with claim 2 wherein said first and second exhaust pipes have a cross section which expands from said first end toward said second end.

4. An internal combustion engine in accordance with claim 2 wherein two of said exhaust ducts and said third exhaust pipe have a combined acoustical flow length such that, at normal engine operating speed, an acoustical wave will travel through said combined length during a time interval approximately equal to the time interval of about 70 degrees of crankshaft rotation.

5. An internal combustion engine in accordance with claim 2 wherein said first and second exhaust pipes are of equal length and wherein one of said exhaust ducts and one of said exhaust pipes have a combined acoustical length such that, at normal engine operating speed, an acoustical wave will travel through said combined length during a time interval approximately equal to the time interval of about 80 degrees of crankshaft rotation.

6. An internal combustion engine in accordance with claim 2 wherein said first and second exhaust pipes are of equal length.

7. An internal combustion engine in accordance with claim 6 wherein said third exhaust pipe has a length greater than the combined lengths of said first and second exhaust pipes.

8. A internal combustion engine in accordance with claim 2 wherein the length of said exhaust ducts from said exhaust ports to said junctions is less than the length from said junctions to said second ends of said first and second exhaust pipes.

9. A two stroke internal combustion engine comprising first, second, third, and fourth cylinders which sequentially fire in the stated series and at an even firing interval of 90° and which include respective first, second, third, and fourth exhaust ports which open and close in response to piston movement, and an exhaust gas discharge means communicating with said exhaust ports and including means operable, incident to firing of said second cylinder and opening of said second exhaust port and the consequent emanation of an outgoing positive acoustical pressure wave from said second exhaust port, for applying the outgoing positive acoustical pressure wave to said first exhaust port for generating a retuning negative acoustical pressure, and for applying the returning negative acoustical pressure pulse to said second exhaust port, and means for substantially preventing the returning negative acoustical pressure wave from adversely affecting the magnitude of the outgoing positive acoustical pressure wave applied to said first exhaust port.

10. An internal combustion engine in accordance with claim 9 wherein said exhaust passage means includes respective first, second, third, and fourth exhaust gas ducts having respective first ends communicating respectively with said exhaust ports of said first, second, third, and fourth cylinders, having respective second ends, and being of equal length between said first and second ends, said second ends of said first and third ducts communicating with each other at a first junction and said second ends of said second and fourth ducts communicating with each other at a second junction, a first exhaust pipe having a first end communicating with said first junction and having a second end communicating with the atmosphere, a second exhaust pipe having a first end communicating with said second junction and having a second end communicating with the atmosphere, and a third exhaust pipe separate from said first and second exhaust pipes and having a first end communicating with said first junction, and a second end communicating with said second junction.

11. An internal combustion engine in accordance with claim 10 wherein said first and second exhaust pipes have a cross section which expands from said first end toward said second end.

12. An internal combustion engine in accordance with claim 10 wherein two of said exhaust ducts and said third exhaust pipe have a combined acoustical flow length such that, at normal engine operating speed, an acoustical wave will travel through said combined length during a time interval approximately equal t the time interval of about 70 degrees of crankshaft rotation.

13. An internal combustion engine in accordance with claim 10 wherein said first and second exhaust pipes are of equal length and wherein one of said exhaust ducts and one of said exhaust pipes have a combined acoustical length such that, at normal engine operating speed, an acoustical wave will travel through said combined length during a time interval approximately equal to the time interval of about 80 degrees of crankshaft rotation.

14. An internal combustion engine in accordance with claim 10 wherein said first and second exhaust pipes are of equal length.

15. An internal combustion engine in accordance with claim 14 wherein said third exhaust pipe has a length greater than the combined lengths of said first and second exhaust pipes.

16. An internal combustion engine in accordance with claim 10 wherein the length of said exhaust ducts from said exhaust ports to said junctions is less than the length from said junctions to said second ends of said first and second exhaust pipes.

* * * * *